(12) United States Patent
Wang

(10) Patent No.: US 10,291,388 B2
(45) Date of Patent: May 14, 2019

(54) SIGNAL DEMODULATION APPARATUS AND METHOD IN CLOSED COMMUNICATION SYSTEM

(71) Applicant: SHENZHEN GOODIX TECHNOLOGY CO., LTD., Shenzhen (CN)

(72) Inventor: Guangyao Wang, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 15/663,807

(22) Filed: Jul. 30, 2017

(65) Prior Publication Data

US 2018/0026780 A1  Jan. 25, 2018

Related U.S. Application Data

(63) Continuation of application No. PCT/CN2016/089742, filed on Jul. 12, 2016.

(51) Int. Cl.
*H04L 7/00* (2006.01)
*H04L 27/06* (2006.01)
(Continued)

(52) U.S. Cl.
CPC ............ *H04L 7/0087* (2013.01); *H04L 27/06* (2013.01); *H04L 27/1566* (2013.01); *H04L 27/22* (2013.01)

(58) Field of Classification Search
CPC ... H04L 7/0087; H04L 27/1566; H04L 27/22; H04L 27/06; H04L 27/00; H04L 27/156;
(Continued)

(56) References Cited

U.S. PATENT DOCUMENTS 4,065,722 A * 12/1977 Francis ............... H04L 27/0008
329/300
5,550,505 A   8/1996 Gaus, Jr.
(Continued)

FOREIGN PATENT DOCUMENTS

CN    1198273 A    11/1998
CN    1265543 A    9/2000
(Continued)

*Primary Examiner* — Sam K Ahn
*Assistant Examiner* — Amneet Singh

(57) ABSTRACT

The present application provides a signal demodulation apparatus and method in a closed communication system. The signal demodulation apparatus includes: an analog voltage comparator, configured to convert a received modulated signal into a digital signal, and output the digital signal; and a sampling decider, configured to sample the received digital signal, and acquire a value represented by the digital signal according to a feature of a sampled digital signal to complete a signal demodulation. The present application improves signal-to-noise ratio of pressure detection, reduces power consumption and increases refresh rate. The apparatus and method according to the present application have the advantages of simple structure, easy to implement, small circuit area and low power consumption, and thus are suitable for a scenario imposing strict requirements on the power consumption and area, for example, a wearable device and the like.

14 Claims, 5 Drawing Sheets

(51) Int. Cl.
*H04L 27/22* (2006.01)
*H04L 27/156* (2006.01)

(58) Field of Classification Search
CPC ....... H04L 27/1563; H03M 1/38; H03M 1/46; H04B 17/318; H04B 5/0025; H04B 7/0447
See application file for complete search history.

(56) References Cited

U.S. PATENT DOCUMENTS

| | | | |
|---|---|---|---|
| 5,777,511 A | | 7/1998 | Masumoto et al. |
| 6,597,238 B1* | | 7/2003 | Matsumoto ........... H03J 1/0008 329/300 |
| 9,225,568 B1 | | 12/2015 | Mei et al. |
| 9,531,400 B1* | | 12/2016 | Wen ....................... H03M 1/403 |
| 9,584,144 B1* | | 2/2017 | Zhou .................. H03K 5/15026 |
| 2003/0151455 A1* | | 8/2003 | Kawai ....................... H03J 7/02 329/300 |
| 2005/0220226 A1* | | 10/2005 | Zhang ..................... H04L 27/14 375/334 |
| 2007/0248192 A1* | | 10/2007 | Brunsch ................. H04L 25/40 375/340 |
| 2008/0252367 A1* | | 10/2008 | Pettersen ................ H04L 27/06 329/311 |
| 2009/0002035 A1* | | 1/2009 | Yamamoto ............. H03K 5/082 327/91 |
| 2009/0046809 A1 | | 2/2009 | Meltzer |
| 2014/0035771 A1* | | 2/2014 | Tsai ........................ H03M 1/12 341/172 |
| 2017/0222654 A1* | | 8/2017 | Xun ....................... H03M 1/44 |

FOREIGN PATENT DOCUMENTS

| | | |
|---|---|---|
| CN | 1681267 A | 10/2005 |
| CN | 1819572 A | 8/2006 |
| CN | 1953438 A | 4/2007 |
| CN | 101729470 A | 6/2010 |
| CN | 201607480 U | 10/2010 |
| CN | 102014093 A | 4/2011 |
| CN | 102123122 A | 7/2011 |
| CN | 103346988 A | 10/2013 |
| CN | 103634263 A | 3/2014 |
| CN | 104300984 A | 1/2015 |
| CN | 104793680 A | 7/2015 |
| EP | 441593 A2 | 8/1991 |
| JP | 03101546 A | 4/1991 |
| JP | 2006148521 A | 6/2006 |
| JP | 2009055097 A | 3/2009 |
| KR | 10-1999-0040488 A | 6/1999 |

* cited by examiner

SIGNAL DEMODULATION APPARATUS AND METHOD IN CLOSED COMMUNICATION SYSTEM

CROSS REFERENCE TO RELATED APPLICATIONS

The present application is a continuation of international application No. PCT/CN2016/089742 filed on Jul. 12, 2016, of which is hereby incorporated by reference in its entirety.

TECHNICAL FIELD

The present application relates to the technical field of signal demodulation, and in particular, relates to a signal demodulation apparatus and method in a closed communication system.

BACKGROUND

Common digital modulation is implemented by binary amplitude shift keying (2ASK), binary frequency shift keying (2FSK), binary phase shift keying (2PSK) and the like; and corresponding demodulation is implemented by filtering, envelop detection, local carrier multiplication, sampling decision and the like.

In a non-closed communication system, since a receiving end has no knowledge of the modulation mode of a transmitting end, a complicated demodulation circuit needs to be configured in order to prevent interference caused by other modulated signals to modulated signals that need to be demodulated.

Referring to FIG. 1, in a typical 2FSK demodulation method, four filters, two envelop detectors and one sampling decider need to be configured in order to prevent interference caused by 2ASK, 2PSK and other modulated signals to the 2FSK modulated signal. This demodulation method is very complicated, and implementation of this method requires a large circuit area and a high power consumption. Therefore, this method fails to accommodate application of ultra-low power consumption. In a closed communication system, since the receiving end acknowledges the modulation manner of the transmitting end, including amplitude, frequency, length and the like information of the carrier, the receiving end may only receive a specific type of modulated signals. Therefore, unlike the scenario of a non-closed communication system, it is unnecessary to consider interference caused by other modulated signals like.

As seen from the above, a closed communication system has the characteristics of single communication signal, fixed modulation manner, and limited power consumption. If the signal demodulation apparatus in a conventional communication system is applied to a closed communication system, an apparatus with a complicated circuit needs to be further configured, which consequently increases power consumption of the communication system.

Therefore, a signal demodulation apparatus in a closed communication system is urgently desired to solve the problem in the related art.

SUMMARY

In view of the above problem, the present application provides a signal demodulation apparatus and method in a closed communication system to solve or partially solve the above problem.

In one aspect, the present application provides a signal demodulation apparatus in a closed communication system. The signal demodulation apparatus includes: an analog voltage comparator, configured to convert a received modulated signal into a digital signal, and output the digital signal; and a sampling decider, configured to sample the received digital signal, and acquire a value represented by the digital signal according to a feature of a sampled digital signal to complete a signal demodulation.

In another aspect, the present application provides a signal demodulation method in a closed communication system. The signal demodulation method includes: converting a received modulated signal into a digital signal; and sampling the received digital signal, and acquiring a value represented by the digital signal according to a feature of a sampled digital signal to complete a signal demodulation.

With the signal demodulation apparatus and method in a closed communication system according to the present application, an analog voltage comparator converts a modulated analog signal into a digital signal; and a sampling decider samples the digital signal and makes a feature judgment to acquire a value represented by the digital signal to complete the signal demodulation. Therefore, the present application employs a simple circuit structure to demodulate the modulated signal in a closed communication system, and may have the advantages of simple circuit structure, easy to implement, small circuit area, low power consumption and the like. Accordingly, the technical solutions according to the present application are suitable for a scenario imposing strict requirements on the power consumption and area, for example, a wearable device and the like.

The above description only summarizes the technical solutions of the present application. Specific embodiments of the present application are described hereinafter to better and clearer understand the technical solutions of the present application, to practice the technical solutions based on the disclosure of the specification and to make the above and other objectives, features and advantages of the present application more apparent and understandable.

BRIEF DESCRIPTION OF THE DRAWINGS

By reading the detailed description of preferred embodiments hereinafter, various other advantages and beneficial effects become clear and apparent for persons of ordinary skill in the art. The accompanying drawings are merely for illustrating the preferred embodiments, but shall not be construed as limiting the present application. In all the accompanying drawings, like reference signs denote like parts. In the drawings.

DETAILED DESCRIPTION

Some exemplary embodiments of the present application are hereinafter described in detail with reference to the accompanying drawings. Although the accompanying drawings illustrate the exemplary embodiments of the present application, it shall be understood that the present application may be practiced in various manners, and the present application shall not be limited by the embodiments illustrated herein. On the contrary, these embodiments are described herein only for the purpose of better understanding the present application, and may integrally convey the scope of the present application to a person skilled in the art.

Figure 1:
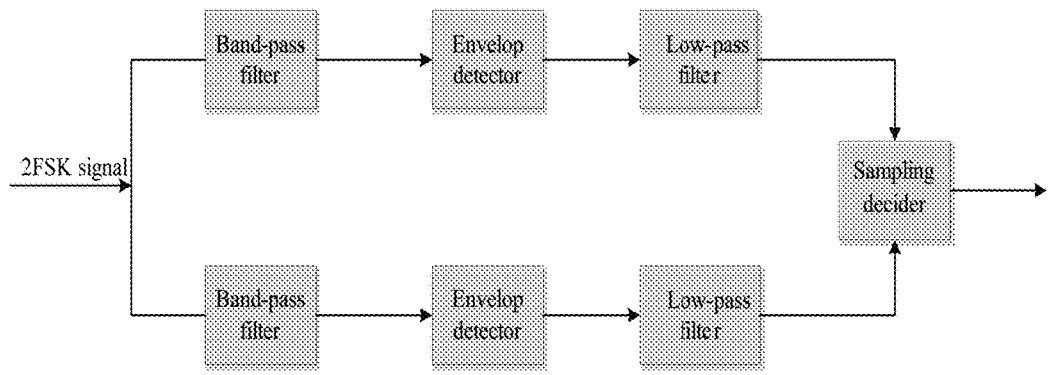
FIG. 1 is a schematic diagram of a conventional 2FSK demodulation circuit.
Figure 2:
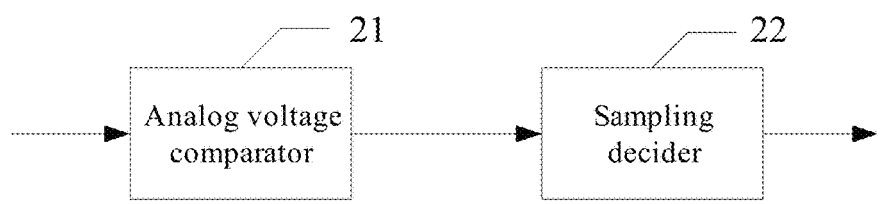
FIG. 2 is a schematic diagram of a signal demodulation apparatus in a closed communication system according to one embodiment of the present application.

Referring to FIG. 2, one embodiment of the present application provides a signal demodulation apparatus in a closed communication system. The signal demodulation apparatus includes:

an analog voltage comparator 21, configured to convert a received modulated signal into a digital signal, and output the digital signal; and a sampling decider 22, configured to sample the received digital signal, and acquire a value represented by the digital signal according to a feature of a sampled digital signal to complete a signal demodulation.

The present application employs a simple circuit structure to demodulate the modulated signal in a closed communication system, and has the advantages of simple circuit structure, easy to implement, small circuit area, low power consumption and the like. Accordingly, the technical solutions according to the present application are suitable for a scenario imposing strict requirements on the power consumption and area, for example, a wearable device and the like.

Another embodiment of the present application provides a signal demodulation apparatus in a closed communication system. The signal demodulation apparatus includes an analog voltage comparator 21 and a sampling decider 22.

Figure 3:
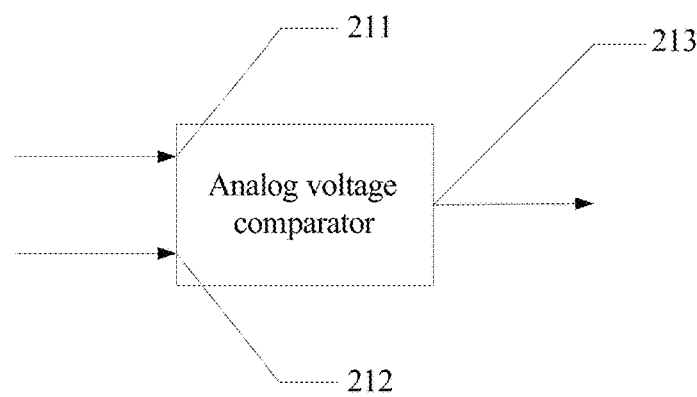
FIG. 3 is a schematic diagram of an analog voltage comparator of the signal demodulation apparatus in the closed communication system according to one embodiment of the present application.

Referring to FIG. 3, the analog voltage comparator 21 includes:

a signal input terminal 211, configured to receive the modulated signal;

a threshold input terminal 212, configured to receive a comparator threshold voltage; and a signal output terminal 213, configured to output a digital signal according to a comparison result between the modulated signal and the comparator threshold voltage.

The signal output terminal 213 is specifically configured to: output a digital signal having a first value if a voltage of the modulated signal is greater than the comparator threshold voltage; and otherwise, output a digital signal having a second value.

Specifically, the first value is 1, and the second value is 0.

When the modulated signal received by the signal input terminal 211 passes through the analog voltage comparator 21, the comparator threshold voltage of the analog voltage comparator 21 only needs to be set to a suitable value. After common digital modulated signals such as 2ASK, 2FSK, 2PSK and the like passes through the analog voltage comparator 21, that is, after the modulated signal is compared with the comparator threshold voltage, value 0 and value 1 both have different apparent features. Therefore, the digital signal composed of 1 or 0 output by the signal output terminal 213 of the analog voltage comparator 21 may be acquired according to the different apparent features.

Figure 4:
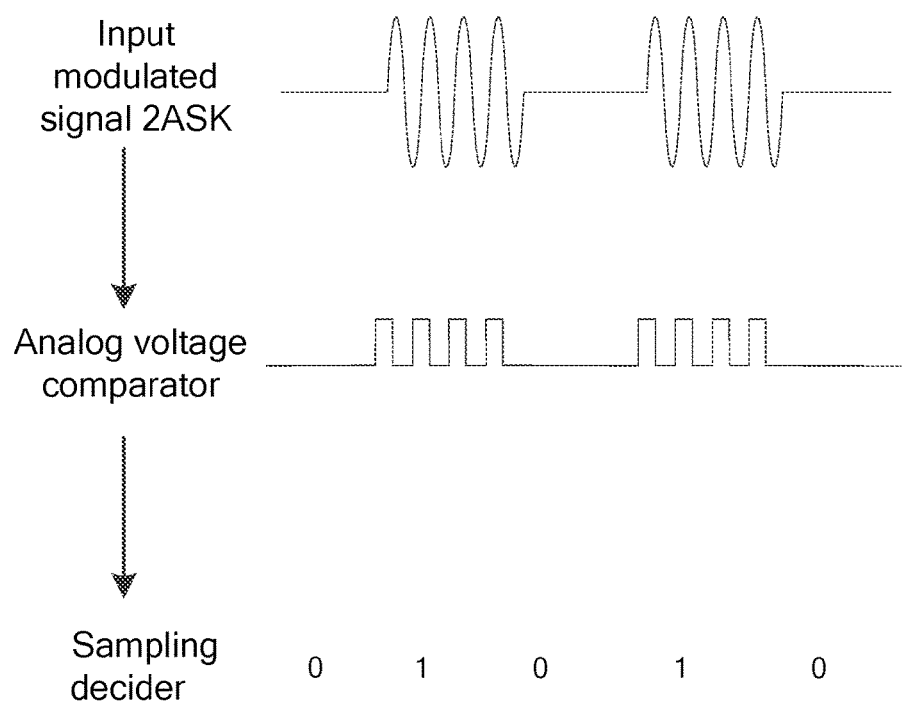
FIG. 4 is a schematic diagram of demodulation of an input 2ASK modulated signal by an analog voltage comparator and a sampling decider.
Figure 5:
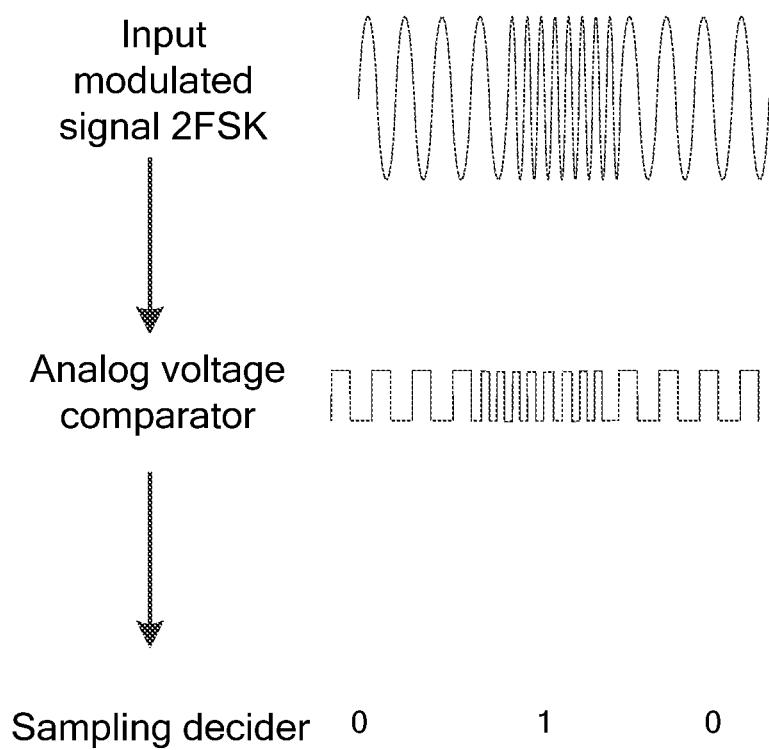
FIG. 5 is a schematic diagram of demodulation of an input 2FSK modulated signal by an analog voltage comparator and a sampling decider.
Figure 6:
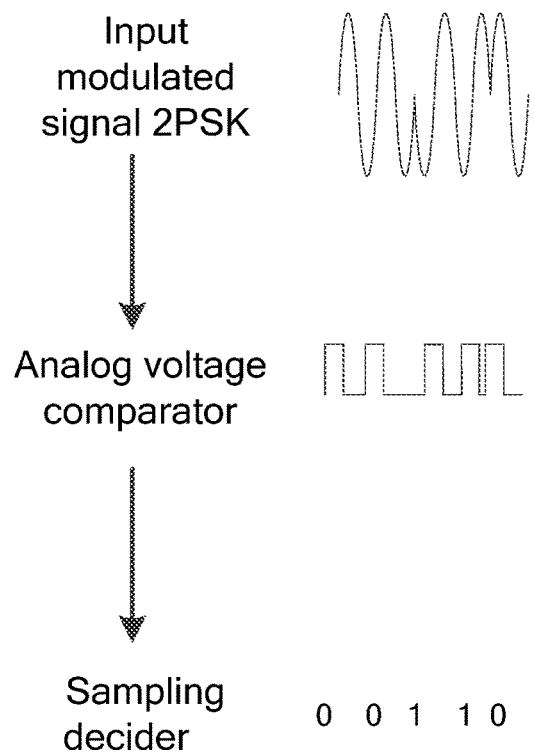
FIG. 6 is a schematic diagram of demodulation of an input 2PSK modulated signal by an analog voltage comparator and a sampling decider.

FIG. 4 illustrates a demodulation process of a 2ASK modulated signal by the analog voltage comparator 21. FIG. 5 illustrates a demodulation process of a 2FSK modulated signal by the analog voltage comparator. FIG. 6 illustrates a demodulation process of a 2PSK modulated signal by the analog voltage comparator. As seen from the above drawings, with respect to a particular digital modulated signal, after the digital signal passes through the analog voltage comparator 21, the acquired square waves all have different apparent features. After the 2ASK modulated signal is demodulated by the analog voltage comparator, a high square wave represents value 1, and a low square wave value represents value 0. After the 2FSK modulated signal is demodulated by the analog voltage comparator, compact square waves represent value 1, and sparse square waves represent value 0. After the 2PSK modulated signal is demodulated by the analog voltage comparator, a cosine wave represents value 1, and a sine wave represents value 0. The digital signal composed of 1 or 0 output by the signal output terminal 213 of the analog voltage comparator 21 is acquired according to the above features.

To achieve an ideal demodulation effect, the comparator threshold voltage is half of a peak voltage of the modulated signal, and the specific value of the comparator threshold voltage may be adjusted according to an application scenario of the signal demodulation apparatus.

Another embodiment of the present application provides a signal demodulation apparatus in a closed communication system. The signal demodulation apparatus includes an analog voltage comparator 21 and a sampling decider 22.

Figure 7:
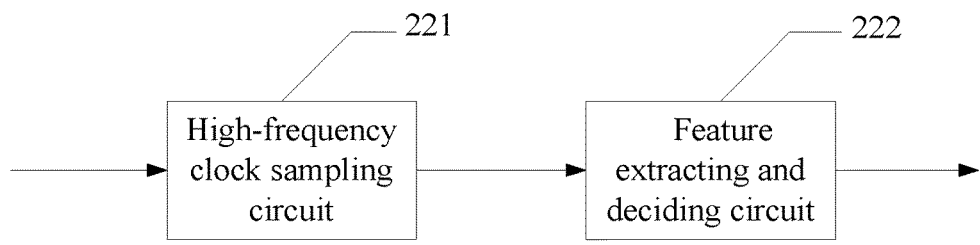
FIG. 7 is a schematic diagram of a sampling decider of the signal demodulation apparatus in the closed communication system according to one embodiment of the present application.

Referring to FIG. 7, the sampling decider 22 includes:

a high-frequency clock sampling circuit 221, configured to sample the digital signal using a high-frequency clock, and output a sampled digital signal; and specifically, a frequency of the high-frequency clock is determined according to a pulse width of the digital signal and an application scenario of the signal demodulation apparatus.

To achieve an ideal demodulation effect, the high-frequency clock sampling circuit samples at least two points for a high level of any pulse of the digital signal using the high-frequency clock;

the sampled digital signal is a contiguous binary code stream; and a feature extracting and deciding circuit 222, configured to extract the feature of the sampled digital signal, and compare the feature extracted with features of known digital modulated signals to acquire the value represented by the digital signal to complete signal demodulation.

The feature includes at least one of: a detection pulse width, a period, a rising edge, and a falling edge of the sampled digital signal.

The feature extracted are compared with features of known digital modulated signals to acquire the value represented by the digital signal, as illustrated in FIG. 4 to FIG. 6, to complete signal demodulation.

Figure 8:
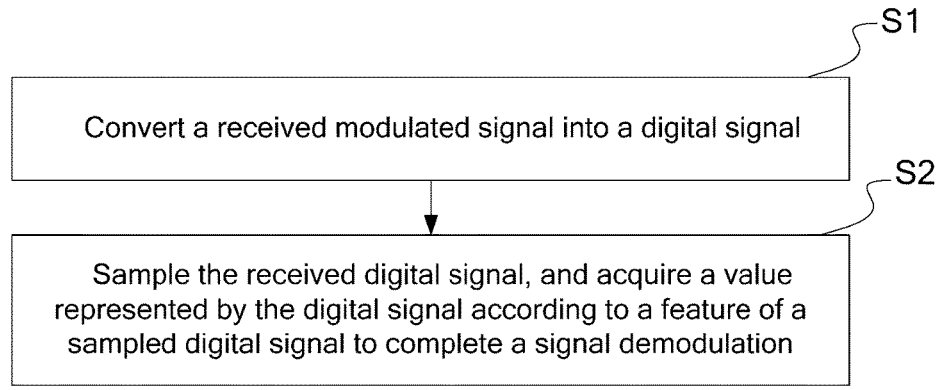
FIG. 8 is a flowchart of a signal demodulation method applied in a closed communication system according to one embodiment of the present application.

Referring to FIG. 8, one embodiment of the present application provides a signal demodulation method applied in a closed communication system. The signal demodulation method includes:

S1: converting a received modulated signal into a digital signal; and

S2: sampling the received digital signal, and acquiring a value represented by the digital signal according to a feature of a sampled digital signal to complete a signal demodulation.

The present application employs a simple circuit structure to demodulate the modulated signal in a closed communication system, and has the advantages of simple circuit structure, easy to implement, small circuit area, low power consumption and the like. Accordingly, the technical solutions according to the present application are suitable for a scenario imposing strict requirements on the power consumption and area, for example, a wearable device and the like.

Another embodiment of the present application provides a signal demodulation method in a closed communication system. The signal demodulation method includes step S1 and step S2.

Figure 9:
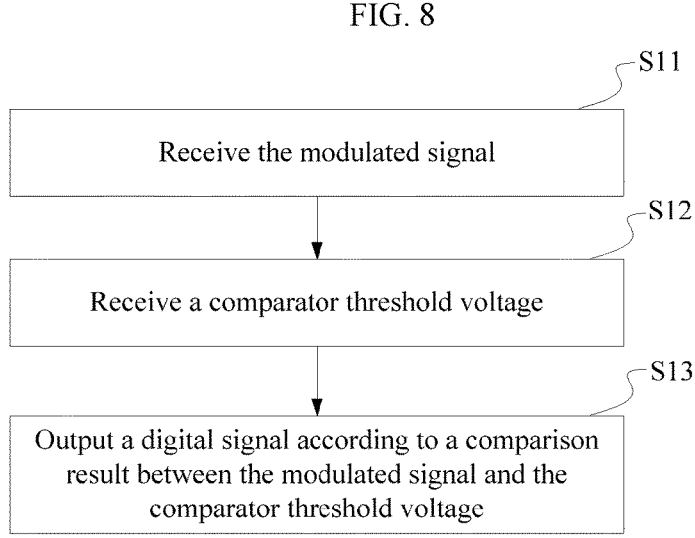
FIG. 9 is a flowchart of step S1 of the signal demodulation method applied in a closed communication system according to one embodiment of the present application.

Referring to FIG. 9, step S1 includes:

S11: receiving the modulated signal;

S12: receiving a comparator threshold voltage; and

S13: outputting a digital signal according to a comparison result between the modulated signal and the comparator threshold voltage.

Step S13 specifically includes: outputting a digital signal having a first voltage; and otherwise, outputting a digital signal having a second value.

Specifically, the first value is 1, and the second value is 0.

When the received modulated signal passes through the analog voltage comparator, the comparator threshold voltage of the analog voltage comparator only needs to be set to a suitable value. After common digital signals such as 2ASK, 2FSK, 2PSK and the like passes through the analog voltage comparator, that is, after the modulated signal is compared with the comparator threshold voltage, value 0 and value 1 both have different apparent features. Therefore, the digital signal composed of 1 or 0 output by the signal output terminal 213 of the analog voltage comparator 21 may be acquired according to the different apparent features.

FIG. 4 illustrates a demodulation process of a 2ASK modulated signal by the analog voltage comparator 21. FIG. 5 illustrates a demodulation process of a 2FSK modulated signal by the voltage comparator. FIG. 6 illustrates a demodulation process of a 2PSK modulated signal by the voltage comparator. As seen from the above drawings, with respect to a particular digital modulated signal, after the digital signal passes through the analog voltage comparator 21, value 0 and value 1 both have different apparent features. Accordingly, the digital signal composed of 1 or 0 output by the signal output terminal 213 of the analog voltage comparator 21 is acquired according to the above features.

To achieve an ideal demodulation effect, the comparator threshold voltage is half of a peak voltage of the modulated signal, and the specific value of the comparator threshold voltage may be adjusted according to an application scenario of the signal demodulation apparatus.

Another embodiment of the present application provides a signal demodulation method in a closed communication system. The signal demodulation method includes step S1 and step S2.

Figure 10:
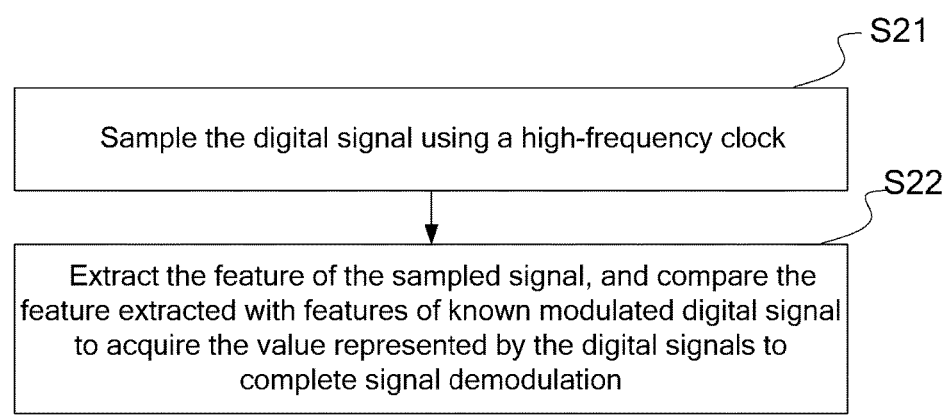
FIG. 10 is a flowchart of step S2 of the signal demodulation method applied in a closed communication system according to one embodiment of the present application.

Referring to FIG. 10, step S2 includes:

S21: Sampling the digital signal using a high-frequency clock.

Specifically, a frequency of the high-frequency clock is determined according to a pulse width of the digital signal and an application scenario of the signal demodulation apparatus.

To achieve an ideal demodulation effect, the high-frequency clock sampling circuit samples at least two points for a high level of any pulse of the digital signal using the high-frequency clock.

The sampled digital signal is a contiguous binary code stream.

S22: Extracting the feature of the sampled digital signal, and comparing the feature extracted with features of known digital modulated signals to acquire the value represented by the digital signal to complete signal demodulation.

The feature includes at least one of: a detection pulse width, a period, a rising edge, and a falling edge of the sampled digital signal.

The feature extracted are compared with features of known digital modulated signal to acquire the value represented by the digital signal, as illustrated in FIG. 4 to FIG. 6, to complete signal demodulation.

The algorithms and displays provided herein are not inherently related to any specific computer, virtual system or other device. Various general-purpose systems may also be used with the teachings herein. According to the above description, the structure required for constructing such systems is obvious. In addition, the present application is not directed to any specific programming language. It should be understood that the content of the present application described herein may be carried out utilizing various programming languages, and that the above description for a specific language is for the sake of disclosing preferred embodiments of the present application.

In the specification provided herein, a plenty of particular details are described. However, it can be appreciated that an embodiment of the present application may also be practiced without these particular details. In some embodiments, well known methods, structures and technologies are not illustrated in detail so as not to obscure the understanding of the specification.

Likewise, it shall be understood that, to streamline the present application and facilitate understanding of one or more of various aspects of the present application, in the above description of the exemplary embodiments of the present application, various features of the present application are sometimes incorporated in an individual embodiment, drawing or description thereof. However, the method according to the present application shall not be explained to embody the following intension: the present application seeking protection claims more features than those explicitly disclosed in each of the appended claims. To be more exact, as embodied in the appended claims, the inventive aspects lie in that fewer features than all the features embodied in an individual embodiment as described above. Therefore, the claims observing the specific embodiments are herein incorporated into the specific embodiments, and each claim may be deemed as an individual embodiment of the present application.

Those skilled in the art should understand that modules in the devices according to the embodiments may be adaptively modified and these modules may be configured in one or more devices different from the embodiments herein. Modules or units or components in the embodiments may be combined into a single module or unit or component, and additionally these modules, units or components may be practiced in a plurality of sub-modules, subunits or subcomponents. Besides that such features and/or processes or at least some of the units are mutually exclusive, all the features disclosed in this specification (including the appended claims, abstract and accompanying drawings) and all the processes or units in such disclosed methods or devices may be combined in any way. Unless otherwise stated, each of the features disclosed in this specification (including the appended claims, abstract and accompanying drawings) may be replaced by a provided same, equivalent or similar substitution.

In addition, those skilled in the art shall understand that, although some embodiments described herein include some features included in other embodiments, rather than other features, a combination of the features in different embodiments signifies that the features are within the scope of the present application and different embodiments may be derived. For example, in the claims appended hereinafter, any one of the embodiments seeking protection may be practiced in any combination manner.

Embodiments of the individual components of the present application may be implemented in hardware, or in a software module running one or more processors, or in a combination thereof. It will be appreciated by those skilled in the art that, in practice, some or all of the functions of some or all of the components in the message prompting apparatus according to individual embodiments of the present application may be implemented using a microprocessor or a digital signal processor (DSP). The present application may also be implemented as an apparatus of a device program (e.g., a computer program and a computer program product) for performing a part or all of the method as described herein. Such a program implementing the present application may be stored on a computer readable medium, or may be stored in the form of one or more signals. Such a signal may be obtained by downloading it from an Internet website, or provided on a carrier signal, or provided in any other form.

Reference herein to "one embodiment", "an embodiment" or to "one or more embodiments" implies that a particular feature, structure, or characteristic described in connection with the embodiments is included in at least one embodiment of the present application. Further, it should be noted that instances of the phrase "in one embodiment" herein are not necessarily all referring to the same embodiment.

In the specification provided herein, a plenty of particular details are described. However, it can be appreciated that an embodiment of the present application may also be practiced without these particular details. In some embodiments, well known methods, structures and technologies are not illustrated in detail so as not to obscure the understanding of the specification.

It should be noted that the above embodiments illustrate rather than limit the present application, and those skilled in the art may design alternative embodiments without departing from the scope of the appended claims. In the claims, any reference sign placed between the parentheses shall not be construed as a limitation to a claim. The word "comprise" does not exclude the presence of an element or a step not listed in a claim. The word "a" or "an" used before an element does not exclude the presence of a plurality of such elements. The present application may be implemented by means of a hardware comprising several distinct elements and by means of a suitably programmed computer. In a unit claim enumerating several devices, several of the devices may be embodied by one and the same hardware item. Use of the words "first", "second", "third" and the like does not mean any ordering. Such words may be construed as naming.

What is claimed is:

1. A signal demodulation apparatus for a closed communication system, comprising:
   an analog voltage comparator, configured to convert a modulated signal that is a hybrid of an information-bearing signal and a carrier signal into a digital signal, and output the digital signal; and
   a sampling decider, configured to sample the digital signal to obtain a sampled digital signal, extract a feature of the sampled digital signal to obtain an extracted feature of the sampled digital signal, compare the extracted feature with features of known digital modulated signals and acquire a value represented by the digital signal to extract the information-bearing signal from the carrier signal to complete a signal demodulation,
   wherein the sampling decider comprises:
      a high-frequency clock sampling circuit, configured to sample the digital signal using a high-frequency clock, and output the sampled digital signal, wherein a frequency of the high-frequency clock is determined according to a pulse width of the digital signal and an application scenario of the signal demodulation apparatus, and the high-frequency clock sampling circuit is configured to sample at least two points for a high level of any pulse of the digital signal using the high-frequency clock; and
      a feature extracting and deciding circuit, configured to extract the feature of the sampled digital signal, and compare the extracted feature with the features of known digital modulated signals to acquire the value represented by the digital signal.

2. The signal demodulation apparatus for the closed communication system according to claim 1, wherein the analog voltage comparator comprises:
   a signal input terminal, configured to receive the modulated signal;
   a threshold input terminal, configured to receive a comparator threshold voltage; and
   a signal output terminal, configured to output the digital signal according to a comparison result between the modulated signal and the comparator threshold voltage.

3. The signal demodulation apparatus for the closed communication system according to claim 2, wherein the signal output terminal is configured to output the digital signal having a first value if a voltage of the modulated signal is greater than the comparator threshold voltage; or otherwise, output the digital signal having a second value.

4. The signal demodulation apparatus for the closed communication system according to claim 3, wherein the first value is 1 and the second value is 0.

5. The signal demodulation apparatus for the closed communication system according to claim 2, wherein the comparator threshold voltage is half of a peak voltage of the modulated signal.

6. The signal demodulation apparatus for the closed communication system according to claim 1, wherein the sampled digital signal is a contiguous binary code stream.

7. The signal demodulation apparatus for the closed communication system according to claim 1, wherein the feature comprises at least one of: a detection pulse width, a period, a rising edge, and a falling edge of the sampled digital signal.

8. A signal demodulation method for the closed communication system, comprising:
   converting a modulated signal that is a hybrid of an information-bearing signal and a carrier signal into a digital signal;
   sampling the digital signal to obtain a sampled digital signal using a high-frequency clock sampling circuit, wherein a frequency of the high-frequency clock is determined according to a pulse width of the digital signal and an application scenario of the signal demodulation apparatus, and the high-frequency clock sampling circuit is configured to sample at least two points for a high level of any pulse of the digital signal; and
   extracting a feature of the sampled digital signal to obtain an extracted feature of the sampled digital signal, comparing the extracted feature with features of known digital modulated signals, and acquiring a value represented by the digital signal to extract the information-bearing signal from the carrier signal to complete a signal demodulation.

9. The signal demodulation method for the closed communication system according to claim 8, wherein the converting a modulated signal into a digital signal comprises:
   receiving the modulated signal;
   receiving a comparator threshold voltage; and
   outputting the digital signal according to a comparison result between the modulated signal and the comparator threshold voltage.

10. The signal demodulation method for the closed communication system according to claim 9, wherein the outputting the digital signal according to a comparison result between the modulated signal and the comparator threshold voltage comprises: outputting the digital signal having a first value if a voltage of the modulated signal is greater than the comparator threshold voltage; or otherwise, outputting the digital signal having a second value.

11. The signal demodulation method for the closed communication system according to claim 10, wherein the first value is 1 and the second value is 0.

12. The signal demodulation method for the closed communication system according to claim 9, wherein the comparator threshold voltage is half of a peak voltage of the modulated signal.

13. The signal demodulation method for the closed communication system according to claim 8, wherein the sampled digital signal is a contiguous binary code stream.

14. The signal demodulation method for the closed communication system according to claim 8, wherein the feature comprises at least one of: a detection pulse width, a period, a rising edge, and a falling edge of the sampled digital signal.

* * * * *